J. Idler.
Cotton Picker.
Nº 1,050.  Patented Dec. 31, 1838.
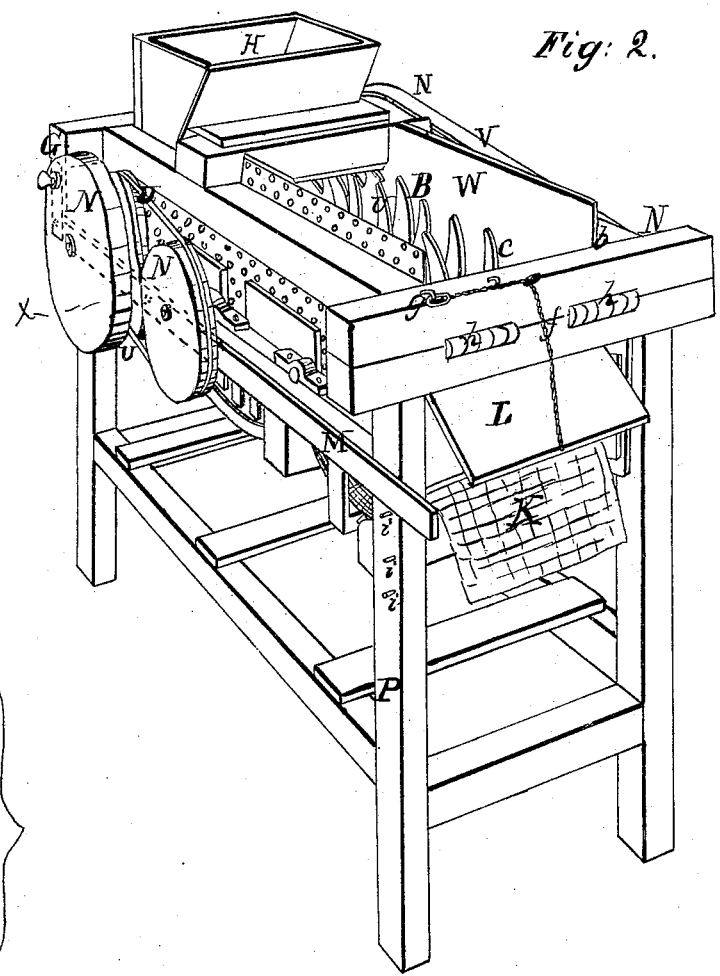
Fig: 2.
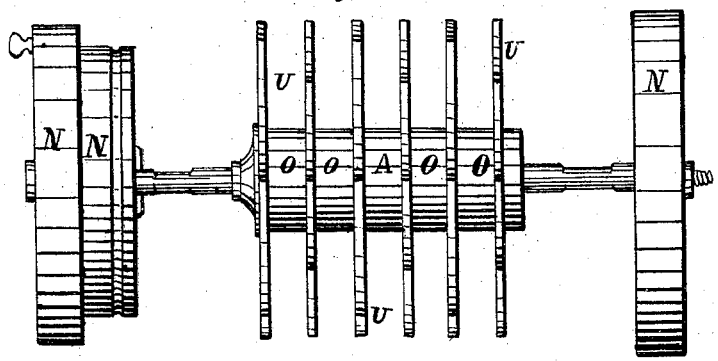
Fig: 5.
Fig: 4.
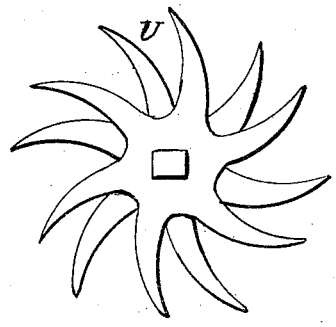
Fig: 8.

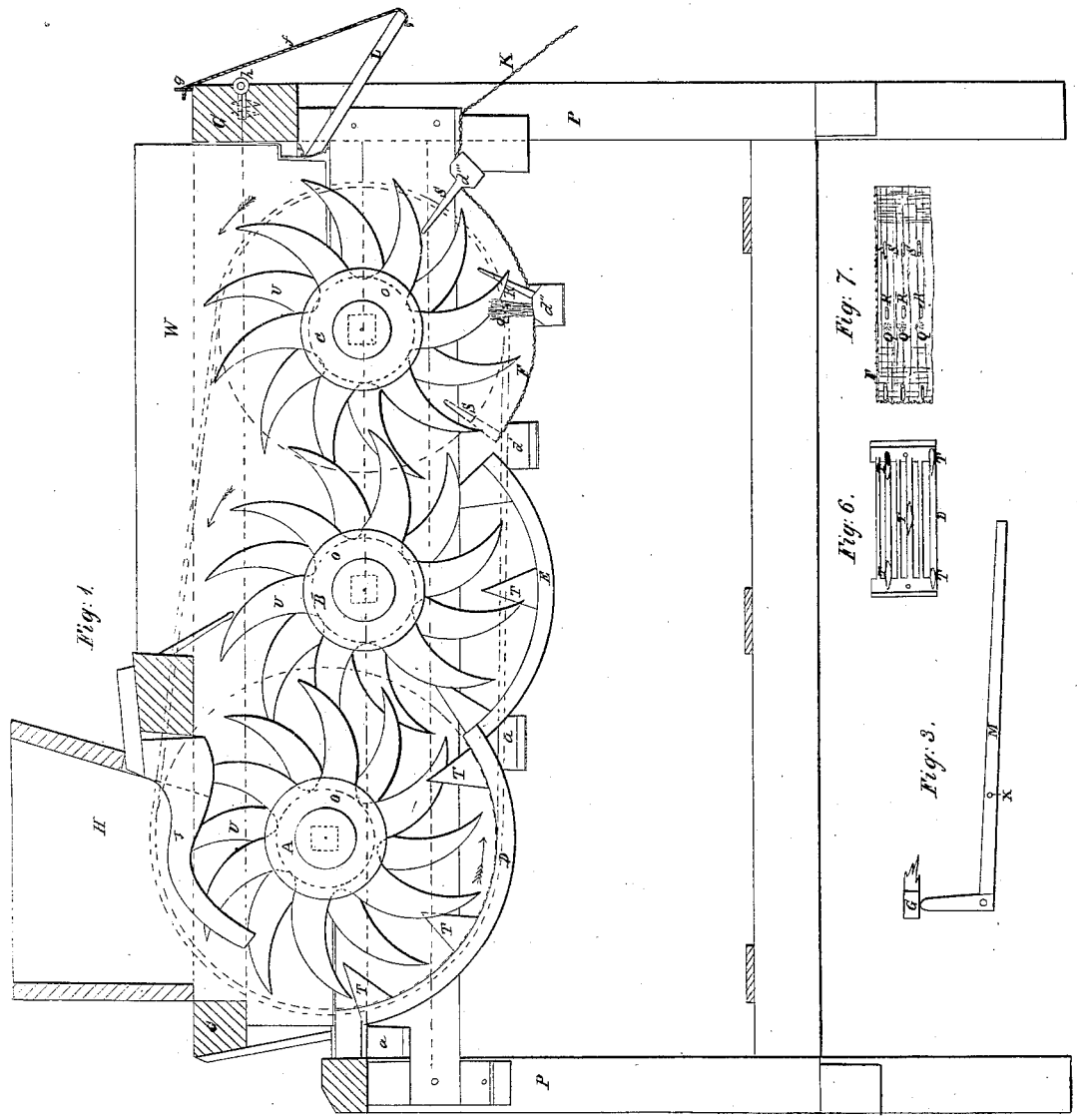

UNITED STATES PATENT OFFICE.

JACOB IDLER, OF PHILADELPHIA, PENNSYLVANIA.

MACHINE FOR SEPARATING TRASH FROM COTTON IN THE SEED.

Specification of Letters Patent No. 1,050, dated December 31, 1838.

*To all whom it may concern:*

Be it known that I, JACOB IDLER, of the city and county of Philadelphia and State of Pennsylvania, have invented a new and useful machine for separating the trashy particles from cotton in the seed preparatory to the ginning operation, called "Idler's repeating cotton-cleaner," which is described as follows, reference being had to the annexed drawings of the same, making part of this specification.

Figure 1, is a longitudinal section of the machine, with the left side of the frame removed,—standing at the rear end of the machine and looking toward it. Fig. 2, is a perspective view of the machine on a small scale, showing the several parts put together and ready for operation. Fig. 3, is a view of the lever for raising the hinged frame and hopper,—its fulcrum being a pin inserted into the left side of the frame. Fig. 4, a longitudinal view of one of the cylinders of bill hook teeth, on a small scale. Fig. 5, top view of a section of a concave grate under the first cylinder. Fig. 6, top view of a section of a grate in the bottom of the hopper. Fig. 7, top view of a section of a concave wire screen under the third cylinder. Fig. 8, view of two plates of bill hook teeth placed side by side.

The letters of reference refer to the same parts in the several figures.

The nature of my invention consists in a certain new combination of frames, revolving cylinders of bill hook teeth, concaves of parallel bars containing triangular straight or other shaped teeth,—concave of reticulated wire and brushes, door, hopper, curved grating at the bottom of the hopper, lever for raising the upper or hinged frame and hopper, axles of cylinders, and pulleys on said axles, and bands, producing a machine by which cotton in the seed is completely cleaned of trash, dead leaves, sand, and other dirt previous to its being passed to the gin, which greatly improves the cotton, and consequently increases its value, the principal feature of the invention consisting in so constructing the machine that the cotton after being once admitted into the machine, is carried around and around by the cylinders of bill hook teeth and whipped, threshed, picked, rubbed, and brushed between the teeth and brushes and over the gratings until thoroughly cleaned, when a trap door at the end of the machine is raised and the cotton, thus cleaned, is discharged, a fresh supply of seed cotton during this operation being prevented from passing into the machine by raising the hinged frame containing the hopper—which removes the grating in said hopper on which the cotton rests, out of the reach of the teeth of the first cylinder.

P, represents the main frame constructed of a suitable shape, size, and strength, to contain and support the several parts of the machine hereafter described. One that I have used and which is represented in the drawings is rectangular and consists of four posts, four side rails, six cross grits at the ends, and four intermediate cross pieces, all well framed together. The frame, however, may be varied according to circumstances.

G, represents a movable frame hinged to the top of the main frame P, at the rear end thereof by hinges $h$ on which frame G the hopper is placed and secured and to which the grate in the bottom thereof is also secured. The frame G is composed of four pieces and an intermediate cross piece to which the hopper grate is screwed:—it is the same size as the main frame on top and its hinges $h$ are fastened to the rear cross cap-piece of the main frame.

A, B, & C, three cylinders of bill hook teeth for cleaning the cotton all made alike placed parallel to each other across the frame, the teeth of one cylinder working deep in the spaces between the teeth of the next cylinder, and having their axles turning in boxes on the sides of the main frame and projecting sufficiently far beyond said boxes to allow of pulleys being fastened permanently on their ends by which they are to be turned by suitable bands passing around them and communicating with the driving power. See Fig. 8 representing two of the plates of bill hook teeth. The bill hook teeth will be described presently.

Each cylinder is composed of a number of cylindrical blocks of wood or metal O of a length equal to the distance that the plates of bill hook teeth are to be placed apart say about one inch and a quarter and between which blocks said plates of teeth are to be secured, which is done by making the axles square, except where they turn in the boxes where they are made round, and then passing said axles through square openings in the center of said round blocks and the plates of bill hook teeth.

The bill hook teeth U are made from metallic plates cast or wrought of a suitable diameter and thickness—say about ten or twelve inches diameter and a quarter of an inch thick placed about one and a quarter inches apart according to the kinds of cotton to be cleaned—there being about six teeth in each plate and about six plates on each axle.

The bill hook teeth are curved in the direction of the movement of the cylinders, which is the same in all three, is from the rear toward the front end of the machine as indicated by the arrows.

D, a concave grate constructed under the first cylinder A, whose bars, which are parallel, are armed with triangular or other shaped teeth T and are supported on transverse cross pieces *a a* of the frame, the teeth of cylinder A, as they revolve, pass between said teeth carrying the cotton with them and beating it against the teeth and bars. The triangular teeth T are cast on the upper or concave surfaces of the aforesaid parallel bars of the concave grate. There are twelve bars in this grate cast in one, two, or more plates, or separate the spaces between them being equal. On the upper surface of the first bar, or that which is next to the left side of the frame, are cast two stout triangular teeth, near the ends of the bars. On the second bar there are no teeth. On the third bar there is one tooth of like size and shape cast near the center of the bar. The fourth bar has none. The fifth has two like the first. The sixth has none; and so on with the other six bars, every alternate bar being without any teeth. There are ten teeth in the concave grate of twelve bars. The plates forming the ends of the sections of the bars are screwed down to the intermediate cross pieces of the frame marked *a*.

E, representing a concave grate under the second or middle cylinder B. This grate is made and arranged in a similar manner to grate D just described.

F represents a concave wire screen placed on and supported by transverse cross pieces *d'*, *d''*, *d'''*, of the main frame P under the third or rear cylinder C, which screen continues beyond the rear end of the frame and inclines or slopes downward forming a chute as at K. Under the center of the cylinder C in the lowest part of the concave screen is arranged a row of upright brushes Q and a row of inclined teeth R set in the transverse piece *d''* through which the bill hook teeth with the cotton pass. The teeth R incline toward the rear of the machine at an angle of about 70 degrees. At the beginning and end of said concave there is a row of plain straight teeth S placed in an inclined position, the teeth of each row pointing toward the center of the cylinder C. These teeth are inserted permanently into the cross pieces *d' d'* before described. There is another row of teeth inserted into the cross piece of the hinged frame to which the grate J is fastened—said teeth pointing downward toward the center of the second or middle cylinder.

G, represents the hinged frame supporting the hopper, the hinges *h* of which are fastened to the rear transverse cap piece of the main frame; H, the hopper to receive the cotton to be cleaned. This is made similar to other hoppers and is fastened to the movable hinged frame G.

J, curved grating at the bottom of the hopper for preventing the descent of the cotton to the cylinder A until drawn through said grating by the bill hook teeth, which grating is cast in one, two or more plates screwed to the cross piece of the hinged frame G at one side. The other side is open and detached leaving a space between it and the side of the hopper of about ¾ of an inch to allow the cotton to descend to the grate D under the first cylinder A when drawn down by the points of the teeth of said cylinder A as it revolves.

The bars or fingers of the grate and the bottom of the hopper are cast something in the shape of the letter S—thicker at their base, or where they unite to the plate screwed to the hinged frame G than at their open or detached ends and are so placed in the bottom of the hopper that the points of the bill hook teeth, as the cylinder A revolves, do not project above the upper surface of the grate at the thicker part but begin to project above as the cylinder revolves when near the center of the grate and gradually shows more of the teeth above the grate as they come near to the outer extremity of the grate, and hook the cotton thereon and draw it through said grate into the concave grate below.

By raising hinged frame in the manner hereafter described the hopper and grate with the cotton thereon is raised out of the reach of the bill hook teeth. When the frame is down the points of the teeth of the first cylinder A project about ¼ to ½ an inch above the top of the finger grates J at the center and produce the effect just described.

L, a trap door hung to a cross piece of the frame P at the rear end thereof to be let down for confining the cotton in the machine a longer time as to subject it to a greater action of the teeth when in a very dirty state and to be raised when the cotton is required to be discharged at the rear end of the machine over the inclined part of the wire screen marked K; M, lever for raising the hinged frame supporting the hopper and finger grate, when the trap door is closed and it is desired to admit no more cotton—the fulcrum of which is seen at X. This lever is a straight bar of wood moving on a pin X as its fulcrum inserted into the left side of the main frame P on the outside and has an upright piece fastened to the outer extremity of its shortest end reaching to the under side of the movable or hinged frame G containing the hopper. N, pulleys fixed on the ends of the axles of the cylinders of bill hook teeth, as before described. These pulleys are made of round blocks of wood in the usual manner and are of such diameter as the speed of the machine may require. On the end of the axle of the first cylinder projecting beyond the left side of the frame are fastened two pulleys—one of which is the driving pulley. On the other end of the same axle is another pulley. On the end of the axle of the second or middle cylinder at the left is fixed a pulley. On the end of the axle of the 3rd cylinder at the right side is a pulley fixed to the axle and turning with it like the rest.

V, bands passing around the pulleys for turning them. The bands are passed around the cylinders in such a manner as to cause them all to turn in the same direction and which is too well known to every mechanic to require any further description. A band is likewise passed around the outside pulley on the end of the axle of the first cylinder. This band leads to the driving power which may be steam, water, horse or manual.

W, boards at the sides of the frame P for confining the cotton and preventing its escape at the sides. The arrows indicate the direction in which the cylinders turn.

Z, pins inserted into the left rear post of the frame under which pins the lever is placed for holding up the frame G with the hopper H. The height at which it may be desired to hold the hopper is determined by the distance apart that said pins are placed.

Operation: The machine is put in motion by a drum which will give 55 to 60 revolutions per minute to the first cylinder A and 60 to 65 revolutions to the second and third cylinders B and C, more or less, according to the state of the cotton. The frame G being down upon the main frame P, the cotton in the seed is put into the hopper H, descends and rests upon the grate J, through which it is gradually hooked or drawn by the bill hook teeth of the cylinder A, which teeth carry it around and beat it against the teeth and bars of the concave grate D; from the teeth of cylinder A it is taken by the teeth of cylinder B, carried around and whipped or driven through and between the teeth of concave E in like manner. From and combed, brushed, and beaten between the teeth and brushes of the concave F. It is then discharged through the door way at the end of the machine and delivered over the inclined wire screen K into a receiver, perfectly cleaned from all trashy substances or dirt. When the cotton is very trashy and dirty and difficult to clean and after a sufficient quantity has been admitted into the machine, the trap door is closed over the discharging opening at the end of the machine and the hinged frame and hopper is raised by the lever M, which will prevent the entrance of any more cotton; that which is thus confined in the machine will then be made to receive a repeated action through and between the several sets of teeth and brushes; for when it arrives at the rear of the third cylinder not finding a discharge it is carried around by said cylinder, when it is taken by the second cylinder and delivered back to the first cylinder which again carries it around as in the first instance to the second cylinder and from the second to the third, and in this manner the operation is repeated until thoroughly cleaned, the trash and dirt falling through the grates and screen below and the spaces at the sides. The trap door L is then opened and the cleaned cotton is discharged over the inclined part of the wire screen K at the rear end of the machine. The trap door is held up by a cord $f$ fastened to a pin $g$.

It is not intended that this machine shall be limited to the precise form, arrangement, size and number of teeth or bars, or cylinders, here described, but it is designed to vary these as circumstances may require while the machine remains substantially the same in principle.

The invention claimed and desired to be secured by Letters Patent consists—

In the before described combination of two or more transverse parallel cylinders of bill hook teeth made from separate plates of metal, each containing six teeth, more or less, working in the spaces between the teeth of the several cylinders, with longitudinal parallel concave bars armed with triangular or other teeth; placed under the first and second cylinders, between which the bill hook teeth work, and a concave of wire net work and transverse rows of inclined teeth and perpendicular brushes through which the bill hook teeth also work and a curved finger grating in the bottom of the hopper fastened to a hinged frame raised or lowered as required by a lever, through which finger grating the teeth of the first cylinder work, in the manner described, for separating the trashy particles from cotton in the seed preparatory to the ginning operations.

JACOB IDLER.

Witnesses:
 ABRAHAM RITTER,
 JACOB B. RITTER.